United States Patent [19]

Clerget et al.

[11] 4,146,926
[45] Mar. 27, 1979

[54] PROCESS AND APPARATUS FOR OPTICALLY EXPLORING THE SURFACE OF A BODY

[75] Inventors: Michel Clerget, La Celle-St-Cloud; François Germain; Jiri Kryze, both of Pontchartrain, all of France

[73] Assignee: Iria Institut de Recherche d'Informatique et d'Automatique, Le Chesnay, France

[21] Appl. No.: 829,936

[22] Filed: Sep. 1, 1977

[30] Foreign Application Priority Data

Sep. 2, 1976 [FR] France ............................... 76 26546

[51] Int. Cl.² ............................................... G06F 15/46
[52] U.S. Cl. .................................... 364/556; 364/525; 350/130
[58] Field of Search ............... 364/556, 559, 560, 561, 364/525; 350/130

[56] References Cited

U.S. PATENT DOCUMENTS

| | | | |
|---|---|---|---|
| 3,670,153 | 6/1972 | Rempert et al. | 364/559 X |
| 4,041,286 | 9/1977 | Sanford | 364/559 X |

*Primary Examiner*—Edward J. Wise
*Attorney, Agent, or Firm*—Karl F. Ross

[57] ABSTRACT

In order to determine the positions in space of certain points on the surface of a body, a laser beam is trained upon a selected punctiform area of that surface and two sets of reflected light rays, traveling along divergent paths, are intercepted and focused by one or two objectives upon one or two receiving surfaces to form a pair of image points thereon. The receiving surface or surfaces may be part of a television camera. The location of each image point with respect to a reference point is numerically coded for utilization in a calculator which mathematically determines the desired position.

11 Claims, 6 Drawing Figures

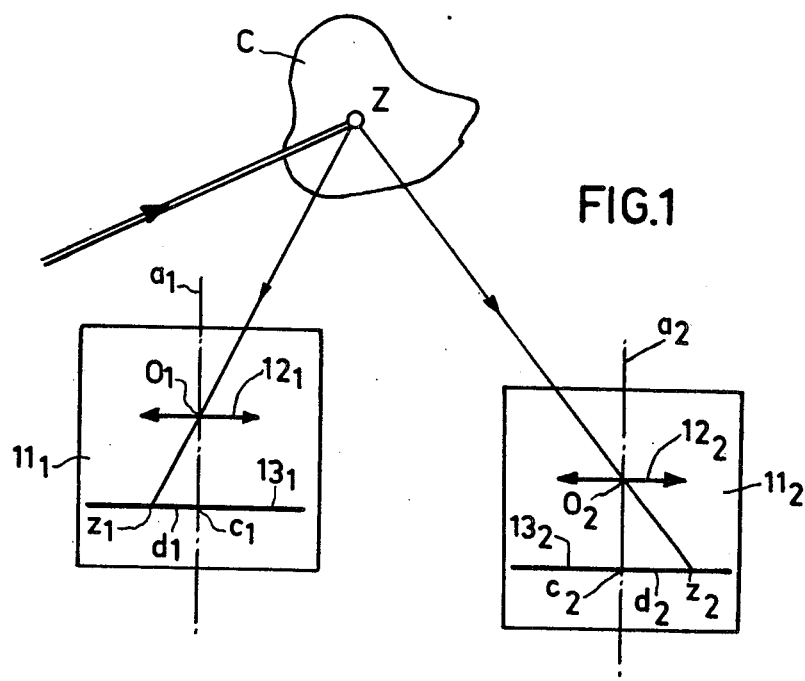
FIG.1
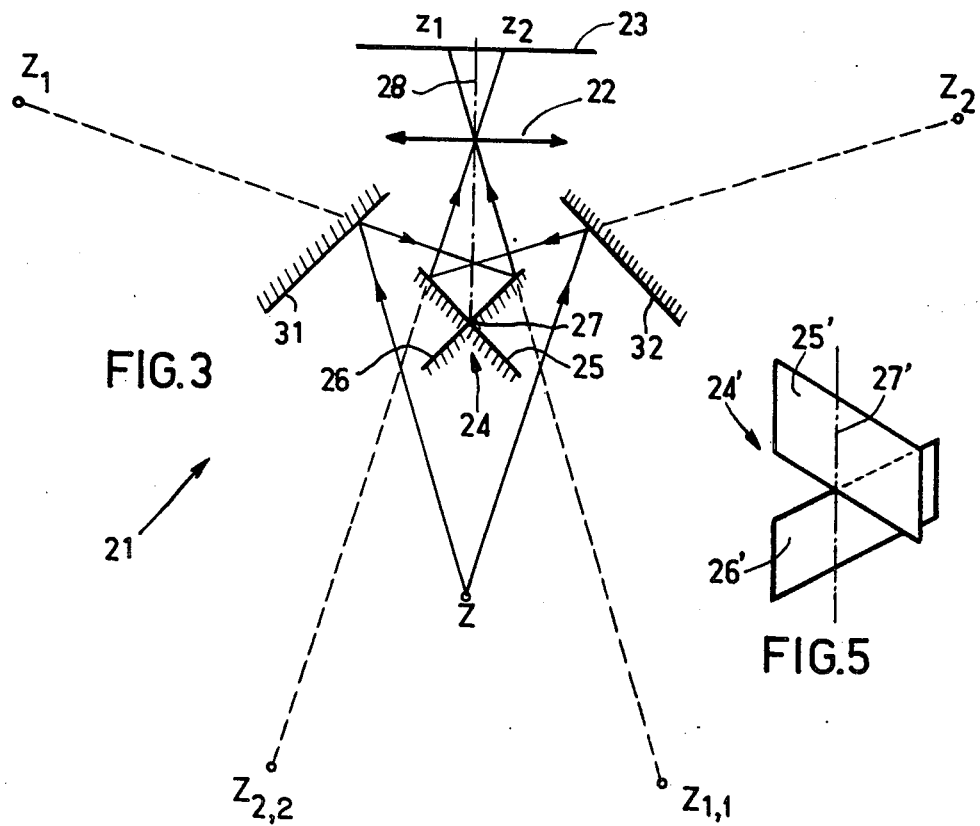
FIG.3
FIG.5

PROCESS AND APPARATUS FOR OPTICALLY EXPLORING THE SURFACE OF A BODY

BACKGROUND OF THE INVENTION

1. Field of the Invention

Our present invention relates to an optical process and apparatus for the three-dimensional determination of the shape of objects by means of a calculator.

2. Description of the prior art

Stereoscopy is often used for the determination of the shape of objects by optical means. A first view of the object and a second are taken, the latter being at a different angle from the former, and consideration of these views makes it possible to determine the position of the different points of the surface of the object, when the locations at which the views were taken are known.

In reality, this process is a delicate operation and the difficulty is particularly great when no reference is available, because it is then impossible to compare the images of a single point on to the two views without other information.

In order to resolve this difficulty, it has been proposed to compare areas of the same shape on both images, and to determine the large or small correlation which exists between, on the one hand, the degrees of illumination of the different points of an area of one image and, on the other hand, those of the different points of variously positioned areas of the same shape of the other image, the correlation obviously being at a maximum when the area on the other image corresponds to the same region of the object as the area of the first image.

Usually, the luminosity of each point of an image is made to correspond to a number expressed in a digital system, and the numbers corresponding to a multiplicity of pairs of points are processed in a calculator with a view to studying their correlation.

This processing is long and complicated, all the more so because it is often necessary to distinguish between several maxima of the correlation.

Analog devices exist, particularly optical devices using rotating mirrors, which make it possible to save a certain amount of time in the calculation of the correlation between the degress of illumination of two areas.

However, apart from being delicate to use and adjust, these analog devices do not overcome the problems posed by the digital devices with reference to the local maxima, the displacements of the moving area, and the like, as well as to the dimension and the shape of the areas, which must be small enough to be "quasi-pinpoint" and large enough to contain the information required in order to carry out the correlation.

If processes of this kind have found a use for topographical surveys from the air or by satellite, their application to present-day industrial purposes is difficult to envisage because of the slow operation which restricts their use to static scenes and also because of the high cost of the calculations involved.

It has also been tried, with a view to a more practical use of the stereoscopy process, to mark the surface of the object whose shape is to be explored. This marking is time-consuming and expensive as well as complicated, and cannot always be used.

Furthermore, the known installations of this type use, in order to take views of the object under observation, two cameras provided with a conventional sweep system, the volume of data provided by the cameras resulting in a long treatment time. These installations are also limited to the representation of a contour line of the surface of the object.

Another installation, which is able to compute a profile line of an object, is known from the German Offenlegungschrift No. 2,113,522, which describes the use of the reflection over the surface of the object of a laser pencil having a variable inclination in a given plane, the reflected pencil being intercepted by a receiving device. The determination of the profile line necessitates the computation of the inclination of the emitted and received pencils with respect to a straight reference line, together with the knowledge of the position of both the laser emitter and the receiving device.

This type of installation is limited both in its object and in its use.

OBJECT OF THE INVENTION

Our invention aims at resolving the problem of determining three-dimensionally the shape of the surface of objects for industrial purposes, e.g. to guide a gripping device towards a multiplicity of loose objects with the aim of taking one of the objects under predetermined conditions, or to direct an instrument towards a certain region of an object of unknown position, operations of this kind depending on what is sometimes called robot function.

More particularly, it is our intention to utilize the well-known phenomenon of parallax i.e. the different angles at which the picture-taking devices (referred to hereinafter as cameras) see a point of a surface of an object whose position is to be determined, in a simplified manner allowing the adaptation of this principle to industrial applications.

The invention takes advantage of the fact that a point of a surface of an object, whether it is illuminated or not, can be distinguished from the other points of the surface by selectively subjecting it to a degree of illumination more intense than that of the other points of the surface. This technique is equally applicable to objects immersed in darkness as to objects subjected to ambient illumination.

In accordance with our invention, a generally punctiform area of a body surface to be explored is selectively subjected to distinctive illumination — advantageously with the aid of a laser beam — to give off reflected light rays. Certain of these light rays, passing along two divergent paths, are intercepted and focused into a pair of image points projected upon a receiving surface or a pair of such surfaces. From the location of each of these image points with respect to a reference point, which may be different for each image point or common to both of them, the position of the distinctively illuminated punctiform area relative to the receiving surface or surfaces is determined through mathematical evaluation.

To carry out the aforedescribed method, our invention provides optical means including a pair of projection objectives or a single such objective. In the latter instance the apparatus also comprises light-guiding means for deflecting the intercepted light rays from different directions toward that objective, advantageously by way of a parallax-increasing reflector assembly. The position evaluator may include coding means for converting the locations of the projected image points, relative to their reference point or points, into numerical values on which an associated calculator can operate. The evaluation could be based, however, on analog rather than digital values.

BRIEF DESCRIPTION OF THE DRAWING

The above and other features of our invention will now be described in detail with reference to the accompanying drawing in which:

FIG. 1 is a schematic view of an apparatus according to the invention;

FIG. 3 is a schematic view of another embodiment;

FIGS. 4 and 5 are detail views of a component of the apparatus of FIG. 3; and

DETAILED DESCRIPTION OF THE INVENTION

In order to determine the shape of a body C, shown in FIG. 1, a pinpoint or quasi-pinpoint region Z of body C is illuminated and that body is observed by means of a first camera $11_1$ and a second camera $11_2$ whose relative position is known. The camera $11_1$ projects with its objective $12_1$, on its photosensitive surface $13_1$, and image $z_1$ of the quasi-pinpoint region Z image $Z_1$ lies at a distance $d_1$ from the point of intersection $c_1$ of the photosensitive surface $13_1$ with the axis $a_1$ of the objective $12_1$.

The camera $11_2$ projects, with its objective $12_2$, an image $Z_2$ of the quasi-pinpoint region Z on its photosensitive surface $13_2$, at a distance $d_2$ from a point $c_2$ which is the intersection of the photosensitive surface $13_2$ with the axis $a_2$ of the objective $12_2$.

A knowledge of the coordinates of the images $z_1$ and $z_2$ formed on the photosensitive surfaces $13_1$ and $13_2$ makes it possible, by elementary geometric and/or trigonometric considerations, to measure the parallax of the pinpoint or quasi-pinpoint region Z in relation to the two cameras, more precisely in relation to the centers $O_1$ and $O_2$ of their objectives $12_1$ and $12_2$.

Figure 2:
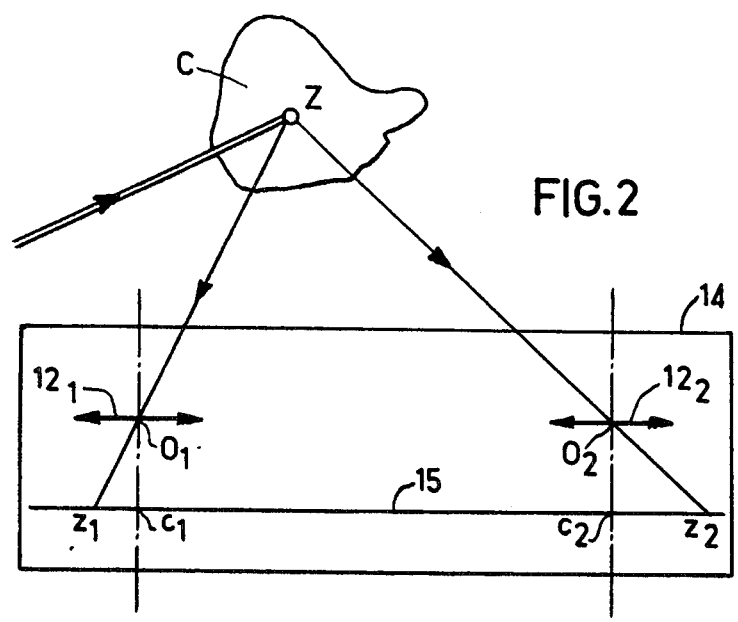
FIG. 2 is a schematic view of a modification of the apparatus shown in FIG. 1.

In the embodiment shown in FIG. 2, the photographs are taken by a single camera 14 comprising two objectives $12_1$ and $12_2$ and a single support for the photosensitive surface 15. The difficulty of the precise alignment of one camera with respect to another is thus eliminated.

Figure 4:
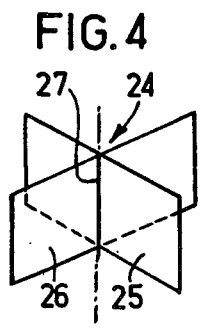

In the embodiment shown in FIG. 3, a camera 21 comprises a single objective or lens assembly 22 placed in front of a single support for the photosensitive surface 23. This camera comprises a ray-transposing device 24 consisting of two crossed mirrors 25 and 26 (see also FIG. 4) including, for example, an angle of 90° with each other. Mirrors 25 and 26 are of the partly transparent or semireflective type, their line of intersection 27 coinciding with the axis 28 of the lens assembly 22.

According to a modification (FIG. 5), a ray-transposing device 24' is used which is made up of two ordinary reflective mirrors 25' and 26', which again cross at an angle of, for example, 90° but are relatively offset along the line 27'.

The mirrors shown in the drawing could be replaced by prisms and/or lenses.

The device 24 or 24' is bracketed by two mirrors 31 and 32 which may be parallel, respectively, to the mirrors 26 and 25. The combination of this ray-transposing device and its two flanking mirrors magnifies the parallactic angle, as will be apparent from the drawing.

In FIG. 3, the path of the reflected back-scattered rays is schematically shown starting from the generally punctiform Z.

The mirror 31 gives an image $Z_1$ of the region Z which is reproduced by the mirror 26 as an image $Z_{1.1}$ projected by the lens assembly 22 at $z_1$ on the receiving surface 23; the position of this image on surface 23 is numerically coded.

In the same way, the mirror 32 gives an image $Z_2$ of the pinpoint region Z which is reproduced by the mirror 25 as an image $Z_{2.2}$. The lens assembly 22 projects the image $Z_{2.2}$ on the receiving surface at a point $z_2$ whose position can again be numerically coded.

The distance between points $z_1$ and $z_2$ is a measure of the parallax and thus of the distance of area Z from the receiving surface.

The position of the quasi-pinpoint region Z is determined by evaluating the numerical codes which represent the positions of the images $z_1$ and $z_2$. Since each of these image positions uniquely defines a principal ray passing through the center of objective $12_1$, $12_2$ or 22, the point Z can be found geometrically or analytically as the intersection of these principal rays.

By directing the illumination pencil onto different quasi-pinpoint or generally punctiform regions of the body C, may thus successively determine the locations of these different regions and, finally, the shape of the body C as a whole.

Figure 6:
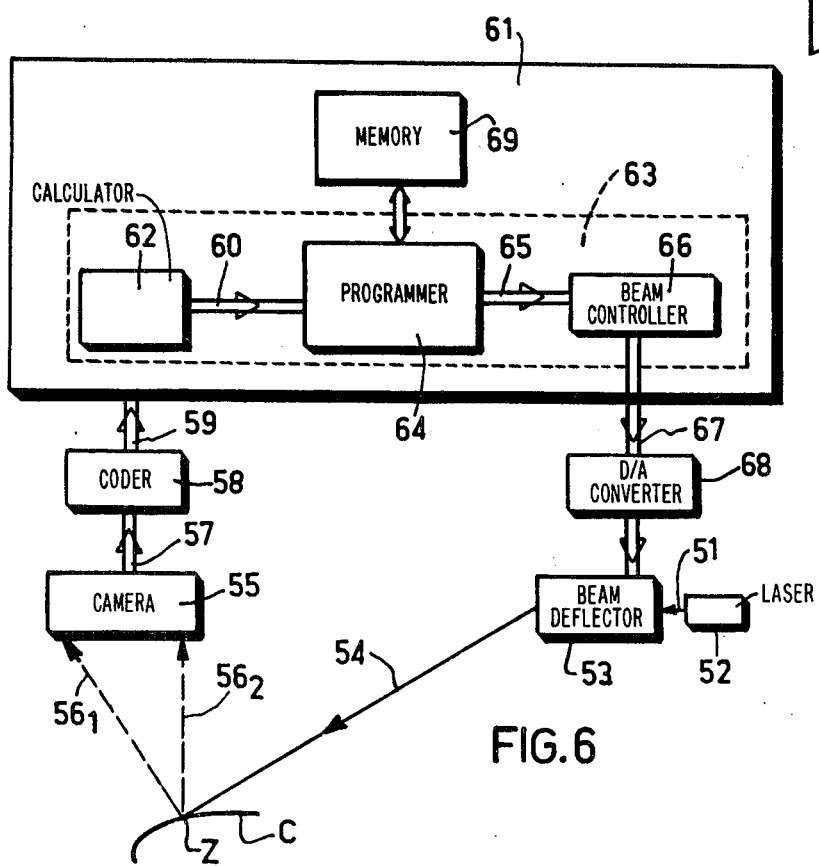
FIG. 6 is a diagram of an installation according to the invention.

In the installation shown in FIG. 6, a laser beam 51 is provided by a laser generator 52 working into by a beam deflector 53 which can be a mirror system controlled by galvanometric means or a solid-phase device controlled piezoelectrically or ultrasonically. A device of this latter type is sold, for example, by the firm SORO ELECTRO-OPTICS, under the name "ACOUSTO-OPTIC LASER DEFLECTOR, MODEL D". The deflected beam 54 issuing from the device 53 illuminates a quasi-pinpoint region Z of the body C. At $56_1$ and $56_2$ we show laser rays reflected by the region Z which traverse two objectives of a television camera 55 comprising a tube or a pair of tubes of the vidicon type or of the image-dissector type, using a "random" read-out, which is very suitable for following a moving point. A device of this type is sold, for example, by the firm EMR SCHLUMBERGER, under the name "OPTICAL DATA DIGITIZER, TYPE 658A". We may also use the "EMR PHOTO-ELECTRIC MODEL S75 IMAGE DISSECTOR" sold by the same firm.

The output 57 of the camera 55 is linked to the input of a coder 58 which provides at its output 59 the coordinates of the illuminated point or points on the image surface of the camera. These numerical codes are fed to the input of a computer 61 which comprises a device 62 for calculating the spatial coordinates of the point Z, the calculator 62 being part of a logic network 63 of this computer. A programmer 64, linked to the calculator 62 by a circuit 60, determines the direction of progress of the luminous beam 54 as a function of the points of the body C which are of interest. The latter can be the points of contour lines, which have the same parallax, or peaks, i.e. points of maximum height which are obtained by starting from any point and progressing according to a line of greatest slope, or points of contours which are characterized by a discontinuity of the parallax.

The above operations are preferably carried out by reading out only one randomly chosen point, without using a scanning sweep.

The information provided by the device 64 is applied through a connection 65 to a device 66 for the digital control of the displacement of the beam; the information present at the output 67 of controller 66 is applied via a digital/analog, converter 68 to the control input of the deflecting device 53.

A memory 69 included in the computer 61 stores a summary of the information acquired. This memory may be a specially wired device or part of a logic system using a universal calculator.

The laser emitter 52, 53 may be replaced by a mobile light source.

Alternatively, the light pencil would be emitted by several sources alternately, thus allowing the intensified illumination of points of a body which could not be reached by a single pencil.

An apparatus according to the invention can form the pick-up of a three-dimensional perception mechanism which is part of a device, such as a telemanipulator, serving for the gripping, positioning or assembly of objects or for the delivery of loosely heaped articles to a machine.

We claim:

1. A process for optically exploring the surface of a body, comprising the steps of:
   selectively subjecting a generally punctiform area of the surface of said body to distinctive illumination;
   intercepting reflected light rays emanating from said punctiform area along two divergent paths;
   focusing the intercepted light rays into a pair of image points projected upon at least one receiving surface;
   determining the location of each of said image points with respect to a reference point; and
   establishing the position of said punctiform area relative to said receiving surface by mathematically evaluating the locations so determined.

2. A process as defined in claim 1 wherein said punctiform area is illuminated by training a laser beam thereon.

3. An apparatus for optically exploring the surface of a body, comprising:
   a source of light selectively trainable upon the surface to be explored for distinctively illuminating a generally punctiform area thereof;
   optical means for intercepting reflected light rays from said punctiform areas, passing along two divergent paths, and for respectively focusing said light rays into a pair of image points projected upon at least one receiving surface; and
   evaluating means responsive to said optical means for converting the locations of each of said image points with respect to at least one reference point into an indication of the position of said punctiform area relative to said receiving surface.

4. An apparatus as defined in claim 3 wherein said source comprises a generator of a laser beam.

5. An apparatus as defined in claim 3 wherein said optical means comprises a pair of projection objectives.

6. An apparatus as defined in claim 3 wherein said optical means comprises a single projection objective and light-guiding means for deflecting said light rays from different directions toward said objective.

7. An apparatus as defined in claim 6 wherein said light-guiding means comprises a parallax-increasing reflector assembly.

8. An apparatus as defined in claim 7 wherein said reflector assembly comprises a pair of ray-transposing mirrors bracketed by a pair of lateral reflectors.

9. An apparatus as defined in claim 3 wherein said receiving surface is of photosensitive character.

10. An apparatus as defined in claim 3 wherein said optical means comprises a television camera.

11. An apparatus as defined in claim 3 wherein said evaluating means comprises coding means for converting said location into numerical values and calculating means connected to said coding means for operating on said numerical values.

* * * * *